United States Patent
Ma

[11] Patent Number: 5,803,569
[45] Date of Patent: Sep. 8, 1998

[54] NOTEBOOK COMPUTER WITH PROJECTION FUNCTION

[76] Inventor: His-Kuang Ma, 4F, No. 48, Sec.2, Chung Cherng Road, Taipei, Taiwan

[21] Appl. No.: 879,770

[22] Filed: Jun. 20, 1997

[51] Int. Cl.[6] .................................................. G03B 21/14
[52] U.S. Cl. ............................................................. 353/120
[58] Field of Search ............................ 353/122, DIG. 3, 353/57, 58, 60, 61, 120

[56] References Cited

U.S. PATENT DOCUMENTS

| | | | |
|---|---|---|---|
| 5,041,965 | 8/1991 | Chen | 353/122 |
| 5,353,075 | 10/1994 | Conner et al. | 353/122 |
| 5,658,063 | 8/1997 | Nasserbakht | 353/122 |
| 5,668,695 | 9/1997 | Nakamura et al. | 353/122 |

Primary Examiner—William Dowling
Attorney, Agent, or Firm—Bacon & Thomas

[57] ABSTRACT

A notebook computer with projecting function including a mainframe and a display. The mainframe has conventional input devices and circuits connecting the display via a rotary shaft. The display is connected to the mainframe by the rotary shaft at one side thereof and includes a liquid crystal display, a cover plate, an assembly of a reflective plate and a luminous body, and a frame at the other three sides of the display and capable of 90 degrees rotation. The liquid crystal display has a display frame at its periphery. When the cover plate and the assembly are disposed on the display frame and the frame is insertably connected to the cover plate, the notebook computer is an ordinary one. But when the cover plate and the assembly are detached from the display frame, and the frame is turned through 90 degrees, the images displayed on the liquid crystal display may be projected with the use of a projector.

5 Claims, 4 Drawing Sheets

NOTEBOOK COMPUTER WITH PROJECTION FUNCTION

BACKGROUND OF THE INVENTION (a) Field of the Invention

The present invention relates generally to a notebook computer, and more particularly to a notebook computer with projecting function.

(b) Description of the Prior Art

Notebook computers are very popular information products today as they are light, compact, and convenient to carry around and may store voluminous information.

On occasions such as seminars or presentations, it is often necessary to project information, data or pictures. The conventional method is to use a separate projector, and the slides have to be prepared beforehand, which is not very convenient and efficient.

With the advance of technology, it will be most advantageous to have a notebook computer having the function of the projector, and the information to be projected may be retrieved directly from the computer, without the need to prepare separate slides.

SUMMARY OF THE INVENTION

Accordingly, a primary object of the present invention is to provide a notebook computer with projecting function for projecting the images or information shown on the liquid crystal display of the computer with the use of a projector.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
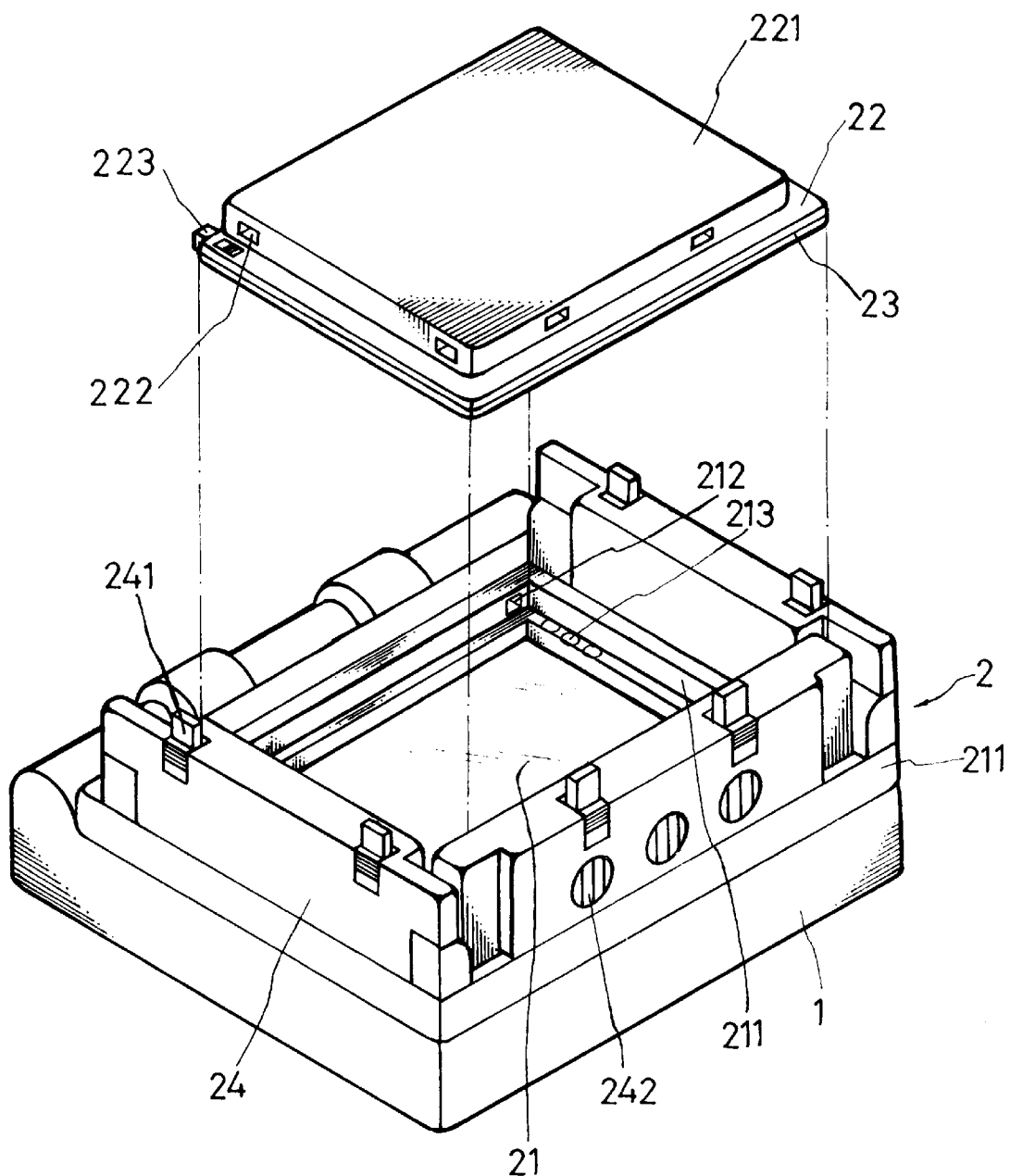
FIG. 1 is an elevational exploded view of the present invention.
Figure 2:
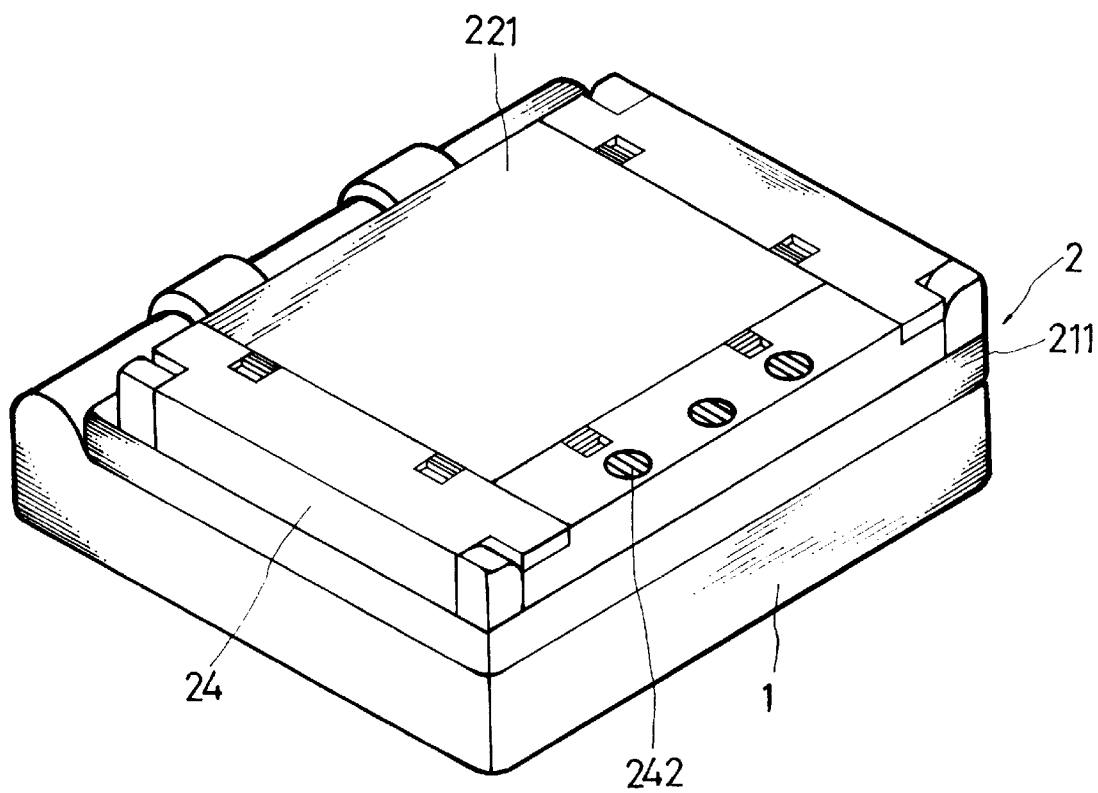
FIG. 2 is a schematic elevational assembled view of the present invention.

With reference to the drawings, the notebook computer according to the present invention is essentially comprised of a mainframe 1, and a display 2.

The mainframe 1 is a conventional structure having a keyboard 11 and other relevant key-in devices at an upper side thereof, and battery slots or expansion slots at lateral sides thereof. A mother board is disposed at a lower side of the mainframe 1 and is connected via circuits to the display 2. As all this belongs to the prior art, it will not be described in detail herein.

The display 2 is connected to the mainframe 1 via a rotary shaft at one side thereof. The display 2 comprises a liquid crystal display (LCD) 21, a cover plate 22, an assembly 23 comprising a reflective plate and a luminous body, and a frame 24 at the other three sides of the display 2.

The liquid crystal display 21 is conventional and is connected to the mainframe 1 via circuits for displaying information. The liquid crystal display 21 has a display frame 211 at its periphery, and the display frame 211 has a plurality of frame holes 212 for insertable connection with the cover plate 22 and the assembly 23. At a horizontal surface of the display frame 211 are disposed a plurality of touch type switches 213 so that when the cover plate 22 touches the assembly 23, the assembly 23 will emit light.

The cover plate 22 is a plate-like structure with an outer plate 221 of a smaller size at an upper part thereof. A peripheral rim of the outer plate 221 is provided with a plurality of outer plate holes 222 for connection with the frame 24. The cover plate 22 is provided with retractable posts 223 that may automatically extend and may retract upon application of force, for insertion into the frame holes 212. The assembly 23 comprising the reflective plate and the luminous body is also conventional and has switches that may contact the touch type switches 213 to make the electrical connection to enable the luminous body to send out light.

The frame 24 is connected to the display frame 211 and may rotate through 90 degrees. At positions corresponding to the outer plate holes 222 at an upper surface thereof, the frame 24 is provided with a plurality of retractable frame posts 241 that may automatically extend and may retract upon application of force. Fans 242 are disposed on the frame 24 at least one side of the display 2 for cooling purposes during projection. Switches controlling the fans 242 are also touch type switches 213. Therefore, when the cover plate 22 contacts the assembly 23, the fans 242 will stop operation and will start operation when they are not in contact.

Referring to the drawings, during assembly, the cover plate 22 along with the assembly 23 is positioned by means of the retractable posts 223 into the corresponding frame holes 212. Then the frame 24 is turned through 90 degrees so that the retractable frame posts 241 insert into the outer plate holes 222 to secure connection with the display 2. At this point, if the display 2 is lifted, the present invention is an ordinary notebook computer, and when the main power is connected, the luminous body of the assembly 23 will emit light.

Figure 3:
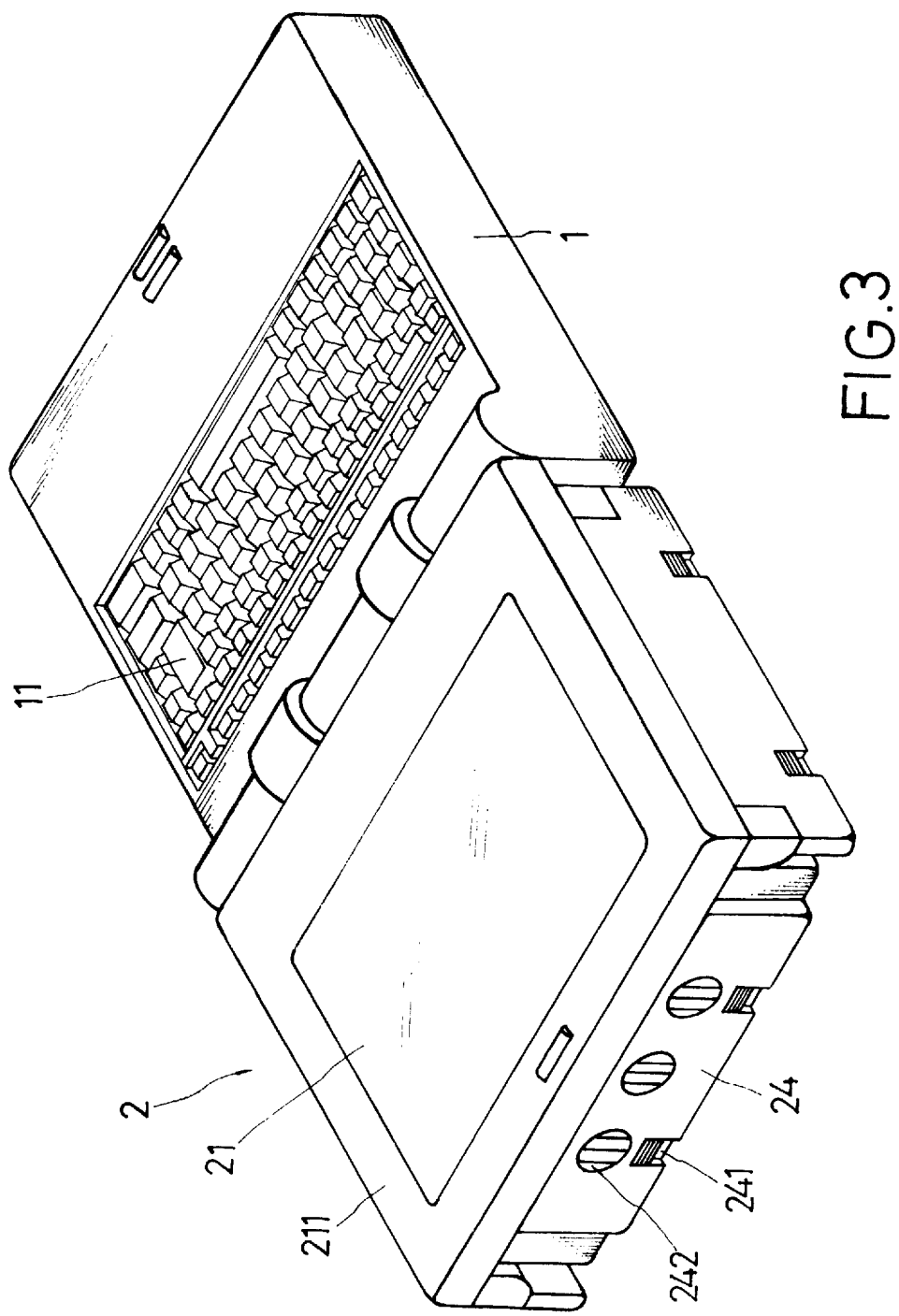
FIG. 3 is a schematic elevational view of the present invention when used in projection.
Figure 4:
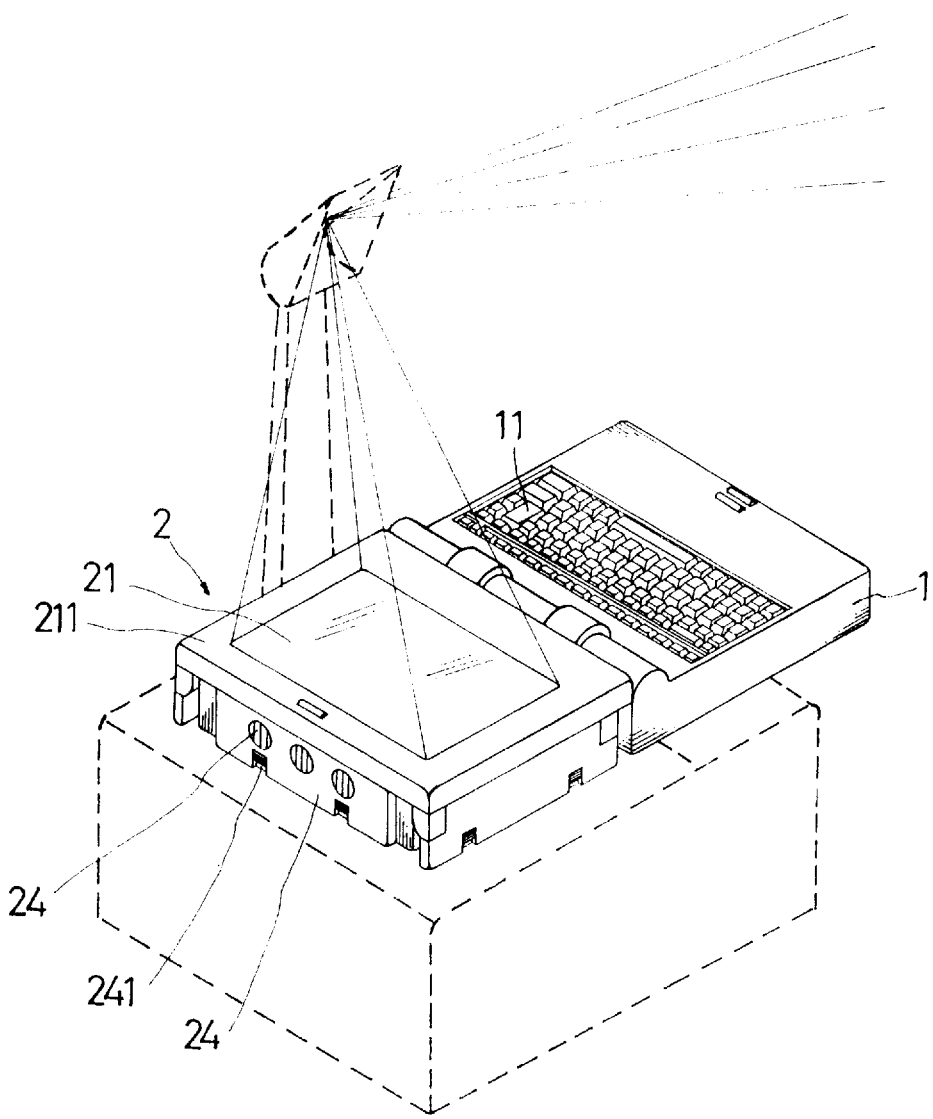
FIG. 4 is a schematic view of the present invention in use.

With further reference to FIGS. 3 and 4, when the present invention is used in projection, the frame 24 is turned through 90 degrees, and the cover plate 22 along with the assembly 23 is detached from the display 2. The display 2 is then lifted and placed on a projector. By using the keyboard, the displayed images on the liquid crystal display 21 may be projected onto a screen via the projector. At this time, the switches controlling the fans 242 are electrically connected, and the frame 24 serves as a shielding device to enhance projection effects.

In view of the above, it can therefore be appreciated that the present invention enables the notebook computer to be used in projection, which is advantageous in the storage and conveyance of information and which is a vast improvement over conventional notebook computers.

Although the present invention has been illustrated and described with reference to the preferred embodiment thereof, it should be understood that it is in no way limited to the details of such embodiment but is capable of numerous modifications within the scope of the appended claims.

What is claimed is:

1. A notebook computer with a projecting function comprising:

a mainframe having input devices and circuits passing through a rotary shaft; and a display having four sides, said display being connected to said mainframe via said rotary shaft at one side thereof and comprising a liquid crystal display, a cover plate, an assembly of a reflective plate and a luminous body, and a frame, said liquid crystal display having a display frame at a peripheral rim thereof and being connected to said cover plate and said assembly by connecting means, said frame being formed at the other three sides of said display and capable of 90 degrees of rotation, wherein at least one portion of said frame at one side of said display is provided with fans and fan switches which, when pressed by said cover plate and said assembly, are electrically disconnected, when said cover plate and said assembly are disposed on said display frame and when said frame is insertably connected to said cover plate, the notebook computer acts as an ordinary computer notebook computer, but when said cover plate and said assembly are disengaged from said display frame and said frame is turned through 90 degrees, the images displayed on said liquid crystal display are projected with the use of a projector.

2. A notebook computer with a projecting function as claimed in claim 1, wherein said connecting means connecting said display frame to said cover plate and said assembly comprise slots corresponding to retractable posts.

3. A notebook computer with a projecting function as claimed in claim 1, wherein said frame is connected to said cover and said assembly by means of slots corresponding to retractable posts.

4. A notebook computer with a projecting function as claimed in claim 1, wherein attachment of said frame is achieved by the use of hinges.

5. A notebook computer with a projecting function as claimed in claim 1, wherein said luminous body of said assembly and said liquid crystal display are integrally provided.

* * * * *